United States Patent
Hiyama et al.

(10) Patent No.: US 6,839,084 B1
(45) Date of Patent: Jan. 4, 2005

(54) IMAGE PICKUP APPARATUS CAPABLE OF SWITCHING MODES BASED ON SIGNALS FROM PHOTOELECTRIC CONVERSION PIXELS

(75) Inventors: Hiroki Hiyama, Atsugi (JP); Shigetoshi Sugawa, Atsugi (JP); Isamu Ueno, Hadano (JP); Katsuhisa Ogawa, Machida (JP); Toru Koizumi, Yokohama (JP); Tetsunobu Kochi, Hiratsuka (JP); Katsuhito Sakurai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,748

(22) Filed: Jun. 16, 1999

(30) Foreign Application Priority Data

Jun. 17, 1998 (JP) .......................................... 10-169925

(51) Int. Cl.[7] ......................... H04N 3/14; H04N 5/335; H04N 5/217
(52) U.S. Cl. ....................... 348/241; 348/294; 348/302; 348/308
(58) Field of Search .......................... 348/241, 302–310, 348/294, 345, 314; 250/208.1; 257/291, 292

(56) References Cited

U.S. PATENT DOCUMENTS

| | | | |
|---|---|---|---|
| 4,835,404 A | 5/1989 | Sugawa et al. | 250/578 |
| 4,879,470 A | 11/1989 | Sugawa et al. | 250/578 |
| 4,972,243 A | 11/1990 | Sugawa et al. | 357/30 |
| 5,162,912 A | 11/1992 | Ueno et al. | 358/213.16 |
| 5,184,006 A | 2/1993 | Ueno | 250/208.1 |
| RE34,309 E | 7/1993 | Tanaka et al. | 358/213.31 |
| 5,262,870 A | 11/1993 | Nakamura et al. | 358/212 |
| 5,539,196 A | 7/1996 | Miyawaki et al. | 250/208.1 |
| 5,693,932 A | 12/1997 | Ueno et al. | 250/208.1 |
| 5,714,752 A | 2/1998 | Ueno et al. | 250/208.1 |
| 6,476,941 B1 * | 11/2002 | Kondo et al. | 358/513 |
| 6,538,693 B1 * | 3/2003 | Kozuka | 348/241 |

FOREIGN PATENT DOCUMENTS

JP         9-205588         8/1997

* cited by examiner

*Primary Examiner*—Wendy R. Garber
*Assistant Examiner*—Justin Misleh
(74) *Attorney, Agent, or Firm*—Fitzpatrick, Cella, Harper & Scinto

(57) ABSTRACT

In order to select an image pickup mode corresponding to purposes, there is provided a photoelectric conversion device comprising a plurality of photoelectric conversion pixels; and a control circuit for controlling a first mode for reading out first and second signals from each of the photoelectric conversion pixels, and a second mode for reading out the first signal from each of the photoelectric conversion pixels, wherein the first signal includes a noise signal produced upon resetting each of the photoelectric conversion pixels, and an optical signal produced by accumulating a photocharge, and the second signal includes a noise signal produced upon resetting each of the photoelectric conversion pixels.

9 Claims, 9 Drawing Sheets

DRIVE WAVE-FORM 1

FIG.3B

DRIVE WAVE-FORM 2

DRIVE WAVE-FORM 1

FIG.5B

DRIVE WAVE-FORM 2

DRIVE WAVE-FORM 1

FIG. 7B

DRIVE WAVE-FORM 2

IMAGE PICKUP APPARATUS CAPABLE OF SWITCHING MODES BASED ON SIGNALS FROM PHOTOELECTRIC CONVERSION PIXELS

BACKGROUND OF THE INVENTION

1. Field of the Invention

The present invention relates to a photoelectric conversion device and, more particularly, to a photoelectric conversion device used to read images in, e.g., a facsimile device, digital copying machine, digital camera, and the like.

2. Related Background Art

Conventionally, as an image reading system for a facsimile device, digital copying machine, or the like, or an image pickup apparatus for a video camera, digital camera, or the like, CCDs have been prevalently used. In recent years, a so-called amplification type photoelectric conversion device which has an amplification function of a MOS transistor or bipolar transistor in units of pixels has been developed extensively.

Figure 1A:
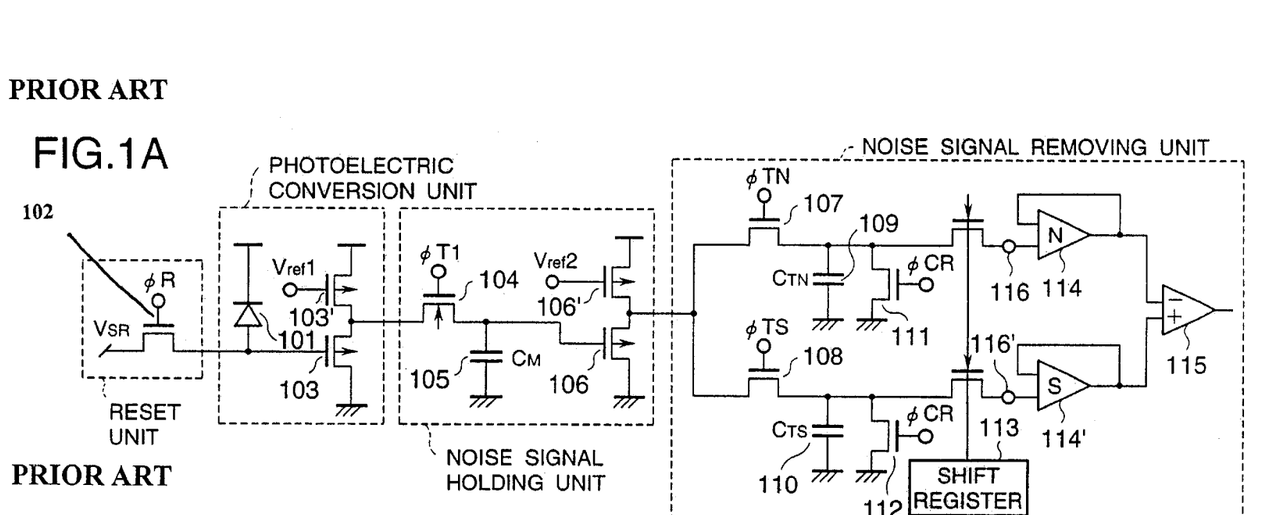
FIGS. 1A and 1B are respectively a circuit diagram and timing chart of a conventional photoelectric conversion device.
Figure 1B:
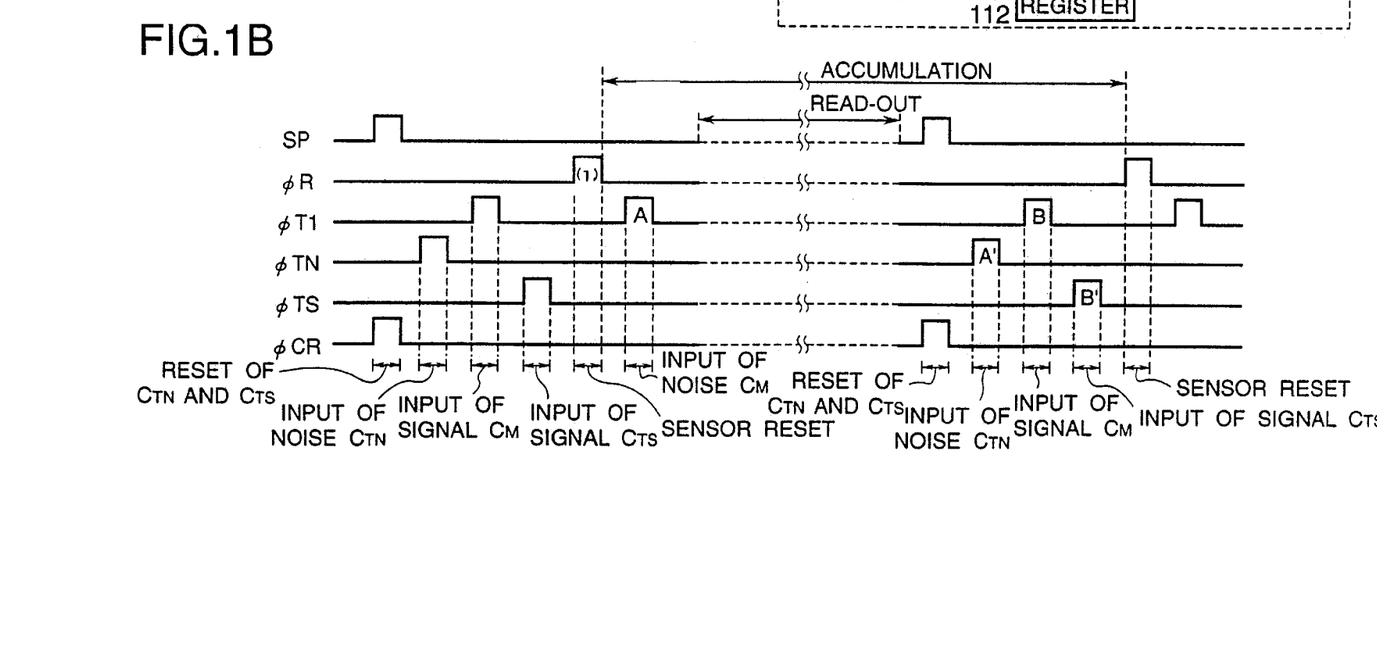

In order to realize high sensitivity in an amplification type photoelectric conversion device, noise removal is required. A photoelectric conversion device for noise removal described in Japanese Patent Laid-Open Application No. 9-205588 will be explained below. FIGS. 1A and 1B are respectively a circuit diagram and timing chart of the photoelectric conversion device. As shown in FIG. 1A, the photoelectric conversion device is characterized by having:

a photodiode 101 and MOS transistors 103 and 103' which construct a photoelectric conversion unit, and a MOS switch 103 serving as a reset means for the photoelectric conversion unit;

MOS transistors 104, 106, and 106', and a capacitor ($C_M$) 105, which construct a noise signal holding unit for holding a noise signal upon resetting the photoelectric conversion unit; and a noise signal removing unit (107 to 116) for removing noise signal using the held noise signal from the signal accumulated by the photoelectric conversion unit after that unit is reset.

Also, a photoelectric conversion device, which has:

a MOS switch 107 and capacitor ($C_{TN}$) 109 which construct a noise signal read-out unit for reading out a noise signal charge immediately after the reset;

a MOS switch 108 and capacitor ($C_{TS}$) 110 which construct an optical signal read-out unit for reading out an optical signal charge after the optical signal is accumulated; and a shift register 113 which serves as a scanning unit for sequentially scanning the noise signal from the noise signal read-out unit, and the optical signal from the optical signal read-out unit, and which makes the scanning unit read out signals from the noise signal read-out unit (107, 109) and optical signal read-out unit (108, 110) and makes the photoelectric conversion unit accumulate an optical signal at the same time, is characterized by including:

a noise signal holding unit (104, 105, 106, 106') for holding a noise signal immediately after the reset until the optical signal accumulated after the reset is read out by the optical signal read-out unit (108, 110); and buffer amplifiers 114 and 114' and a differential amplifier 15 which construct a unit for outputting a difference between the held noise signal immediately after reset, and the optical signal after the reset.

Note that the MOS transistors 106 and 106', and 103 and 103' respectively form MOS source-follower circuits.

Inputs 116 and 116' of the buffer amplifiers 114 and 114' are common output lines, and circuits other than the buffer amplifiers 114 and 114' and differential amplifier 115 are prepared in correspondence with the number of bits required.

In this photoelectric conversion device, all the circuits illustrated in FIG. 1A are formed on a single semiconductor substrate.

The operation and arrangement of the photoelectric conversion device will be explained below with reference to the timing chart in FIG. 1B.

Upon receiving a start pulse SP, the capacitors $C_{TS}$ 110 and $C_{TN}$ 109 for respectively accumulating an optical signal and noise signal are reset first.

Subsequently, a drive pulse φTN is turned on to read out a noise signal held by the capacitor $C_M$ 105 to the capacitor $C_{TN}$ 109. At this time, the noise signal read out from the capacitor $C_M$ 105 is a noise signal obtained immediately after a sensor was reset in the previous field. After the noise signal is read out to the capacitor $C_{TN}$ 109, a drive pulse φT1 is turned on to read out an optical signal to the capacitor $C_M$ 105. Furthermore, a drive pulse φTS is turned on to read out the optical signal to the capacitor $C_{TS}$ 110.

After that, a drive pulse φR is turned on to reset the sensor. Subsequently, the drive pulse φT1 is turned on to read out a signal immediately after the sensor was reset to the capacitor $C_M$ 105 as a noise signal. Then, the sensor starts accumulation.

Simultaneously with accumulation by the sensor, the optical signal and noise signal held by the capacitors $C_{TS}$ 110 and $C_{TN}$ 109 are sequentially output onto the common output line. Finally, a difference signal between the optical and noise signals is obtained by a differential circuit (not shown) or the like, and is output as a net optical signal.

Hence, in the present invention, a noise signal obtained at a sensor reset timing (1) shown in the timing chart is held in the capacitor $C_M$ 105 during the accumulation period (A), and is input to the capacitor $C_{TN}$ 109 before the optical signal is read out (A'). Hence, the difference between the noise signal (A') and optical signal (B') obtained at the identical sensor reset timing can be output as a net optical signal, sensor reset noise can be completely removed.

Also, the noise removing unit can be used not only in a photoelectric conversion device but also in a clamp circuit and the like.

However, in the above-mentioned photoelectric conversion device, it is often more important to read out photocharges at high speed by adjusting their accumulation start and end times than to attain smaller noise components. More specifically, for example, upon picking up an electronic flash light-control signal, an auto-focus (AF) signal, or the like, a high-speed read-out process is required rather than high S/N ratio of the signal.

SUMMARY OF THE INVENTION

It is an object of the present invention to provide a photoelectric conversion device which can select an appropriate image pickup mode in correspondence with various purposes.

According to one aspect of the present invention, there is provided a photoelectric conversion device comprising a photoelectric conversion element, memory means for storing a photoelectric conversion signal from the photoelectric conversion element, read-out means for reading out the photoelectric conversion signal stored in the memory means, and switch means for transferring the photoelectric conversion signal to the memory means, wherein an image pickup mode in which the memory means is reset before the photoelectric conversion signal is read out, and an image pickup mode in which the memory means is reset after the photoelectric conversion signal is read out are selectively used.

According to an another aspect of the present invention, there is provided a photoelectric conversion device comprising a plurality of photoelectric conversion pixels and control means for controlling a first mode for reading out first and second signals from each of the photoelectric conversion pixels, and a second mode for reading out the first signal from each of the photoelectric conversion pixels, wherein the first signal includes a noise signal produced upon resetting each of the photoelectric conversion pixels, and an optical signal produced by accumulating a photocharge, and the second signal includes a noise signal produced upon resetting each of the photoelectric conversion pixels.

According to a still another aspect of the present invention, there is provided an image pickup device comprising a plurality of photoelectric conversion pixels, focus adjustment means for performing focus adjustment using a signal obtained in a second mode; and control means for switching between a first mode for reading out first and second signals from each of the photoelectric conversion pixels, and a second mode for reading out the first signal from each of the photoelectric conversion pixels, wherein the first signal includes a noise signal produced upon resetting each of the photoelectric conversion pixels, and an optical signal produced by accumulating a photocharge, and the second signal includes a noise signal produced upon resetting each of the photoelectric conversion pixels; and wherein the device further comprises chrominance signal correction means for correcting a chrominance signal using a signal obtained in the first mode under a focus condition adjusted by the focus adjustment means.

Other objects and features of the present invention will become apparent from the following description of the embodiments taken in conjunction with the accompanying drawings.

DESCRIPTION OF THE PREFERRED EMBODIMENTS

The first embodiment will be described below.

Figure 2:
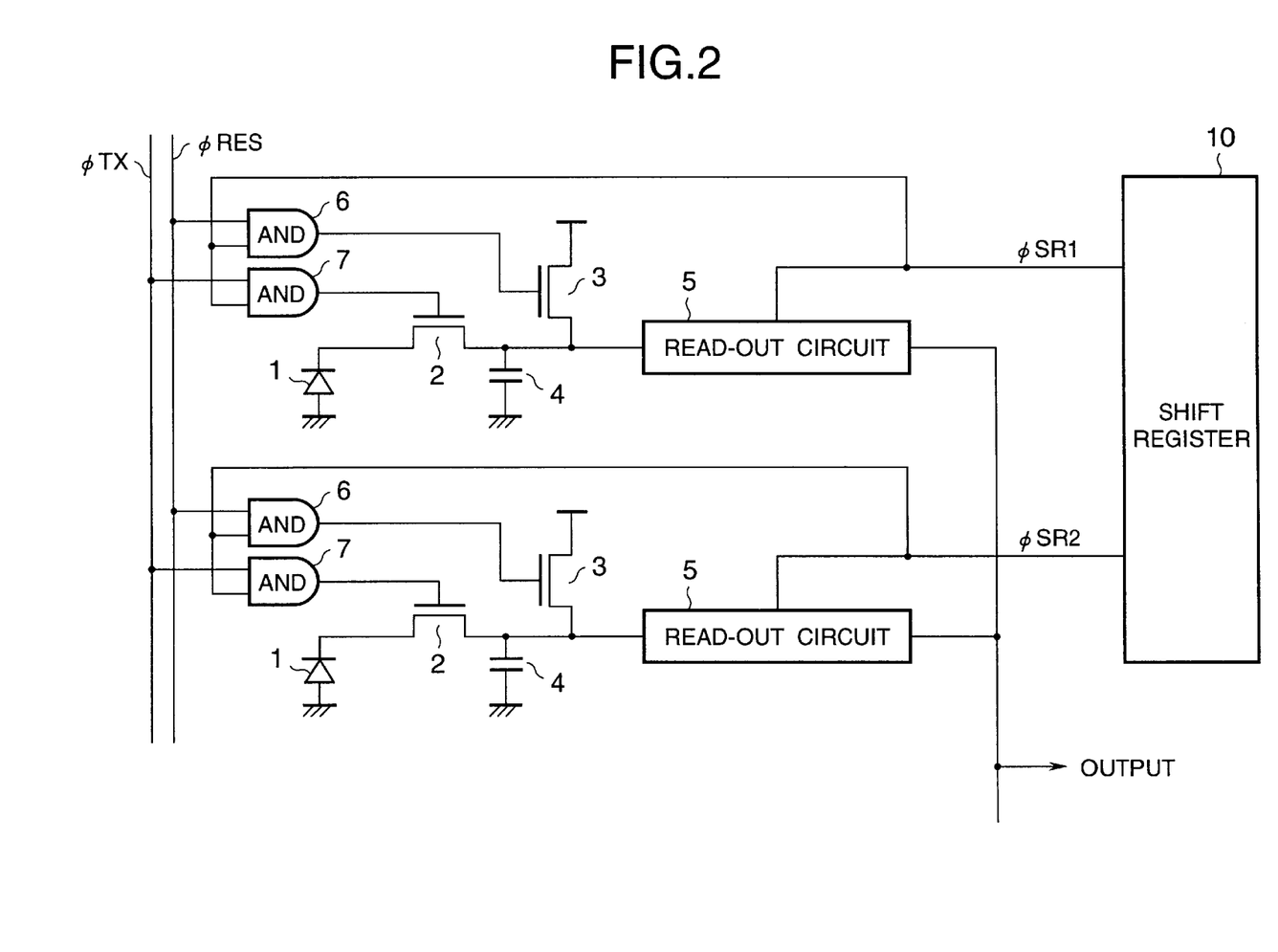
FIG. 2 is a circuit diagram showing the first embodiment of the present invention.

FIG. 2 is a circuit diagram of the first embodiment of the present invention.

Referring to FIG. 2, a photoelectric conversion element 1 such as a photodiode accumulates photocharges upon receiving light for a predetermined period of time, and photoelectrically converts the photocharges. A transfer switch 2 transfers the photocharges accumulated by the photoelectric conversion element 1, a reset switch 3 resets the photocharges at a gate electrode transferred by the transfer switch 2 to a power supply potential, and a memory unit 4 includes a parasitic capacitance in the electrode to which charges are transferred by the transfer switch 2. A read-out circuit 5 reads out the value of photocharges at the electrode transferred by the transfer switch 2. These components 1 to 5 construct a single photoelectric conversion pixel. The circuit shown in FIG. 2 also includes reset AND gates 6 and transfer AND gates 7.

The operation of the photoelectric conversion device shown in FIG. 2 will be described below with reference to the timing charts shown in FIGS. 3A and 3B.

Figure 3A:
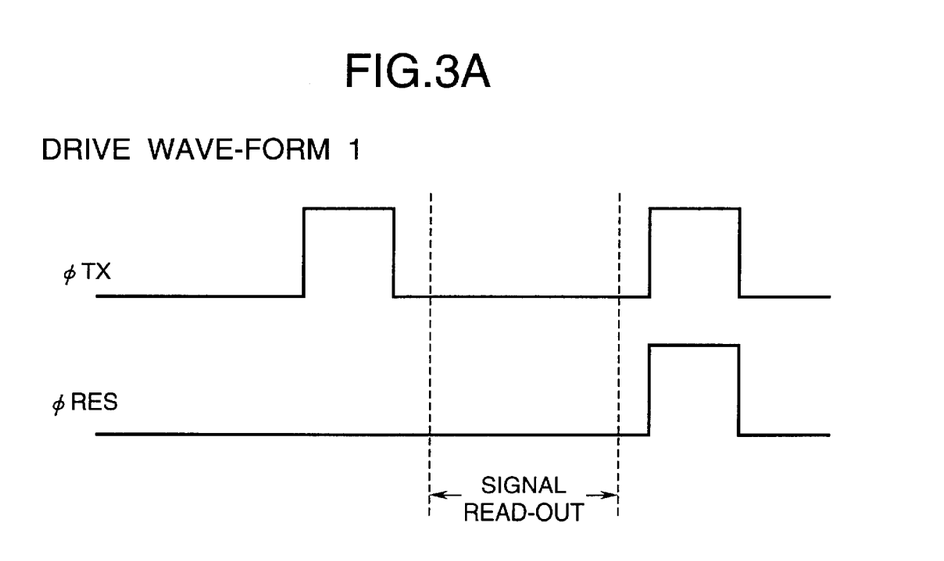
FIGS. 3A and 3B are timing charts used in the first embodiment of the present invention.

In drive wave-form 1 shown in FIG. 3A, photocharges accumulated by the photodiode 1 are transferred to the gate electrode of the read-out circuit 5 by turning on the transfer switch 2 in response to High level of a transfer pulse $\phi TX$, and are accumulated in the memory unit 4, which also converts the transferred photocharges into an optical signal voltage. After that, the optical signal voltage at the gate electrode is read out by activating the read-out circuit 5 in response to a shift pulse $\phi SR1$ from a shift register 10. A reset pulse $\phi RES$ is changed to High level simultaneously with the transfer pulse $\phi TX$ to turn on the transfer switch and reset switch, thereby simultaneously resetting the photodiode 1 and the gate electrode of the read-out circuit 5.

In this arrangement and operation (high-speed image pickup mode), since the entire photoelectric conversion device is reset, residual photocharges in the photodiodes 1 and the like are not read out, and the read-out timing of noise components is omitted. Hence, this mode is suitable when high-speed image pickup invulnerable to noise components is required like image pickup upon setting AF focus conditions, image pickup upon setting of AE conditions, moving image pickup, and the like.

Figure 3B:
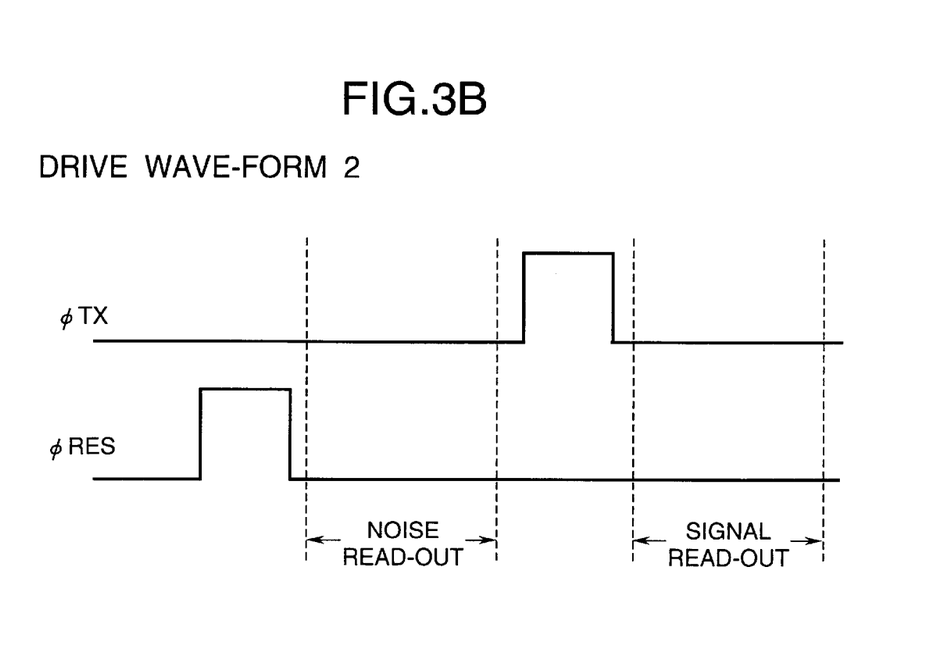

In drive wave-form 2 shown in FIG. 3B, after the photodiode 1 accumulates charges for a predetermined period of time, a reset pulse $\phi RES$ is changed to High level to reset the gate electrode of the read-out circuit 5 to a power supply voltage, while accumulating charges in the photodiode 1. After that, the residual photocharges at the gate electrode of the read-out circuit are time-serially read out as a noise component level of the photoelectric conversion element. Subsequently, a transfer pulse $\phi TX$ is changed to High level to turn on the transfer switch 2, thereby transferring photocharges in the photodiode 1 to the gate electrode of the read-out circuit 5. Finally, the read-out circuit 5 is enabled in response to a shift pulse $\phi SR1$ from the shift register 10 to read out an optical signal charge at the gate electrode. In this arrangement and operation (high speed image pickup mode), since both the optical signal voltage and noise component level are read out, the noise component level is subtracted from the optical signal voltage to obtain an image signal with high S/N ratio. Such image signal with high S/N ratio is suitable when high precision is required like upon picking up a still image and the like.

In order to selectively use the high-speed image pickup mode and precise image pickup mode, upon, e.g., setting the AE or AF conditions, the high-speed image pickup mode is automatically set. However, upon picking up a moving image or still image, the user may select the mode he or she wants. The above-mentioned reset pulse, transfer pulse, and output pulse from the shift register are driven by a controller such as a CPU or the like in accordance with the selected mode.

The second embodiment will be described below.

Figure 4:
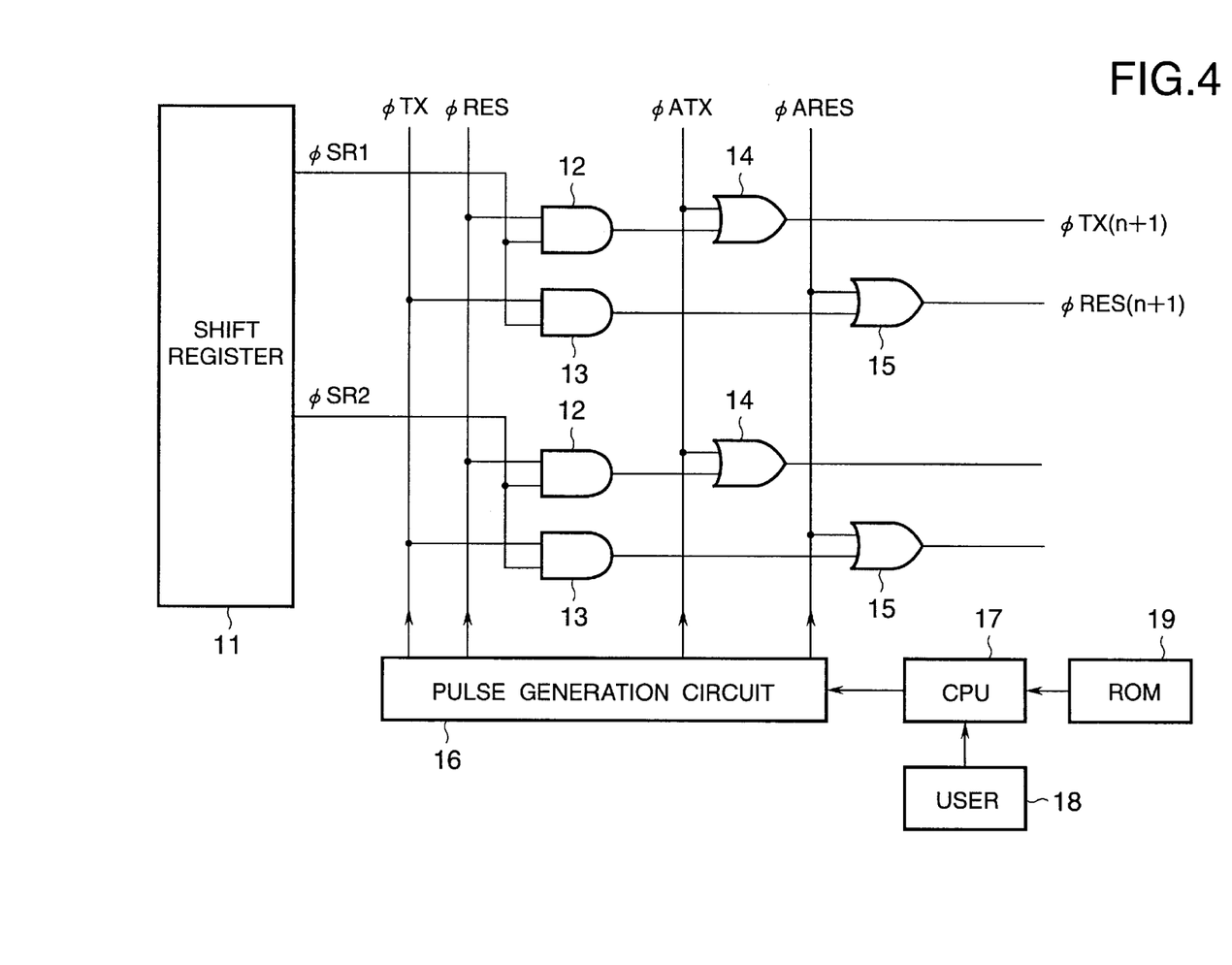
FIG. 4 is a circuit diagram showing the second embodiment of the present invention.

FIG. 4 is a circuit diagram showing a circuit for generating drive pulses in a photoelectric conversion device. Shift pulses φSR1 and φSR2 output from a shift register 11, and a transfer pulse φTX and reset pulse φRES output from a pulse generation circuit 16 are input to AND gates 12 and 13. The outputs from the AND gates 12 and 13 are input to OR gates 14 and 15 in response to a simultaneous transfer pulse φATX and simultaneous reset pulse φARES from the pulse generation circuit 16. The OR gates output a transfer pulse φTX(n+1) for driving each photoelectric conversion element, and a reset pulse φRES(n+1).

Such pulse generation circuit 16 generates drive pulses in response to timings from a CPU 17 which is controlled by a user selection circuit 18 used by the user to select an arbitrary mode, or a ROM 19 that stores a program for controlling the modes.

The operation of the drive pulse generation circuit in accordance with drive pulses will be explained below with reference to FIGS. 5A and 5B.

Figure 5A:
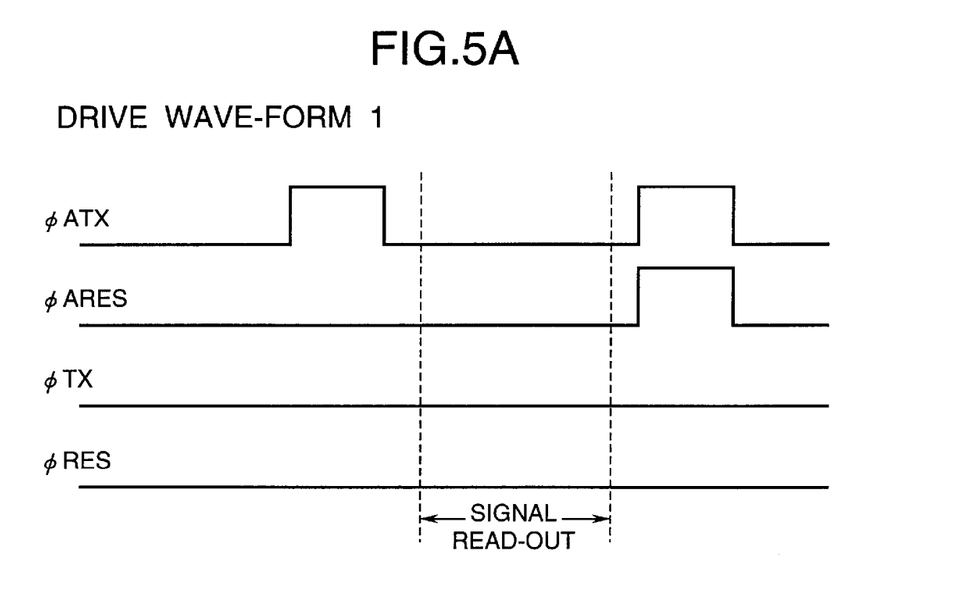
FIGS. 5A and 5B are timing charts of the second embodiment of the present invention.

In drive wave-form 1 shown in FIG. 5A, a simultaneous transfer pulse φATX goes High at the accumulation end time of each photoelectric conversion element, the outputs from each OR gate 14 goes High, and photocharges accumulated in photoelectric conversion elements in all photoelectric conversion pixels are transferred to read-out circuits. After that, photoelectric charge signal voltages are time-serially read out across all the pixels. Upon completion of read-out, both the simultaneous transfer pulse φATX and simultaneous reset pulse φARES are changed to High level to change the outputs from the OR gates 14 and 15 to High level, thus resetting photodiodes of the photoelectric conversion elements and the input gate electrodes of the read-out circuits in all the photoelectric conversion pixels. After the reset, the photodiodes begin to accumulate photocharges.

With this arrangement and operation (high-speed image pickup mode), since the read-out timing of noise components is unnecessary, this mode is suitable when high-speed image pickup invulnerable to noise components is required like image pickup upon setting AF focus conditions, image pickup upon setting of AE conditions, moving image pickup, and the like.

Figure 5B:
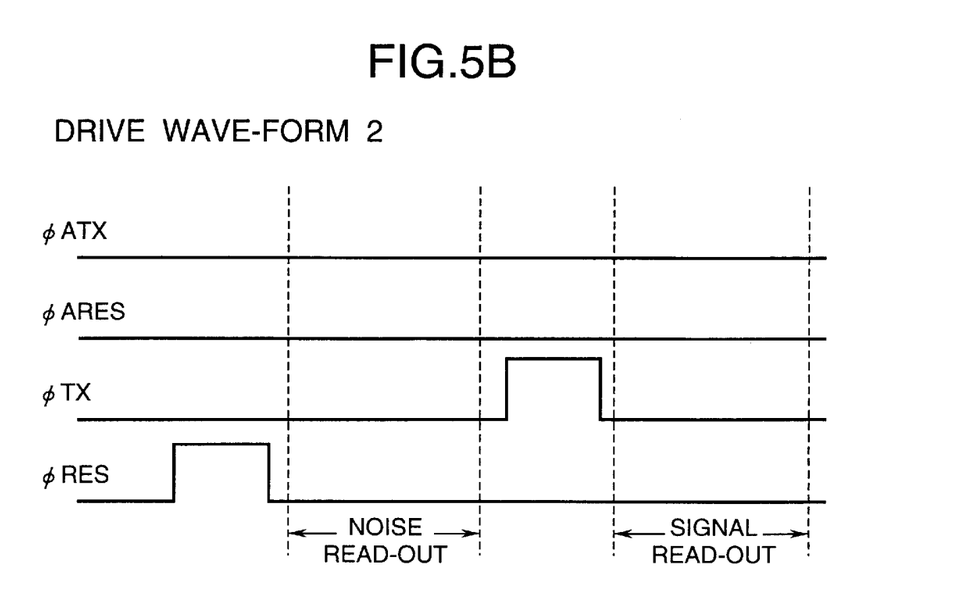

In drive wave-form 2 shown in FIG. 5B, a shift pulse φSR1 is changed to High level and a reset pulse φRES is changed to High level to change the outputs from each AND gate 12 and OR gate 14 to High level, thus resetting the input gate electrode of each read-out circuit. After that, the shift pulse φSR1 is kept at High level, and the residual charges at the input gate electrode of each read-out circuit are time-serially read out and output as a noise component level. When the accumulation end time of each photodiode has been reached, a transfer pulse φTX is changed to High level to change the outputs from each AND gate 13 and OR gate 15 to High level, thus accumulating photocharges in each photodiode in a memory unit such as a parasitic capacitance or the like of the input gate electrode of each read-out circuit. The photocharge signal voltage is read out and output by the read-out circuit. In such arrangement and operation (precise image pickup mode), since the optical signal voltage and noise component level are read out, the previously stored noise component level is subtracted from the output signal voltage, thus extracting an image signal with high S/N ratio. Such image signal with high S/N ratio is suitable when high precision is required like upon picking up a still image and the like.

The third embodiment will be explained below.

Figure 6:
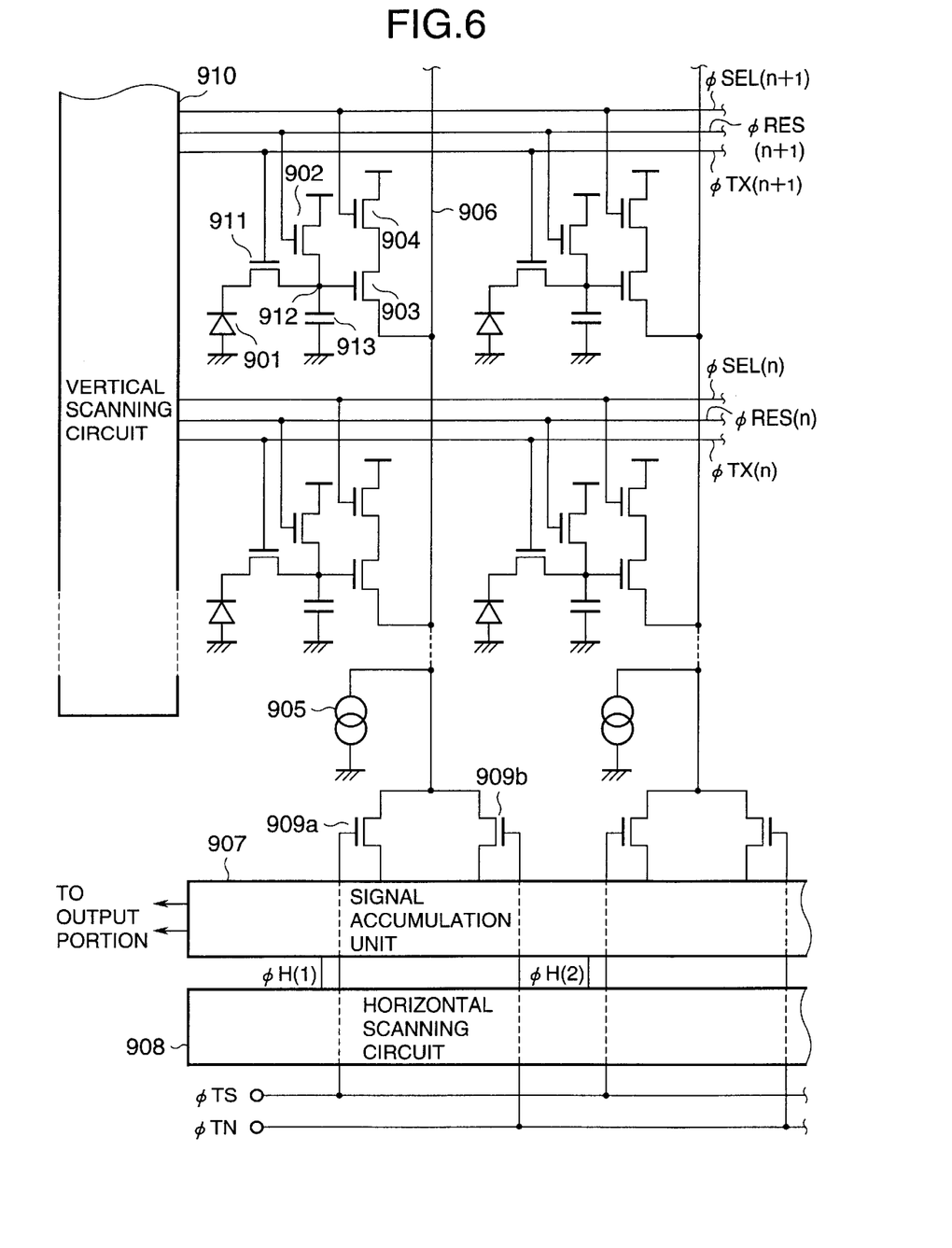
FIG. 6 is a circuit diagram showing the third embodiment of the present invention.

FIG. 6 is a circuit diagram of a photoelectric conversion device according to the third embodiment. Referring to FIG. 6, photocharges are accumulated in a photoelectric conversion element 901 of each photodiode, are transferred by a transfer switch 911, are read out onto a signal output line 906 connected to the source of an amplification MOSFET 903 that constructs an amplification source-follower type amplifier circuit by a load current source 905, and are then transferred to a transfer capacitor of a signal accumulation unit 907 by a signal transfer switch 909b. A reset switch 902 resets the gate electrode of then amplification MOSFET 903 to a power supply voltage, and a selection switch 904 is turned on in response to a line selection pulse φSEL to enable the amplification MOSFET 903. The signal transfer switch 909b and a noise component transfer switch 909a transfer charges in response to signal transfer pulses φTS and φTN, and the transferred charges are time-serially read out from a horizontal scanning circuit onto signal and noise output lines via the signal output lines 906. The readout charges are then output to an output unit. A vertical scanning circuit 910 is comprised of circuits except for the CPU 17, user selection circuit 18, and ROM 19 in the diagram of FIG. 4 that has been explained in the second embodiment.

Figure 7A:
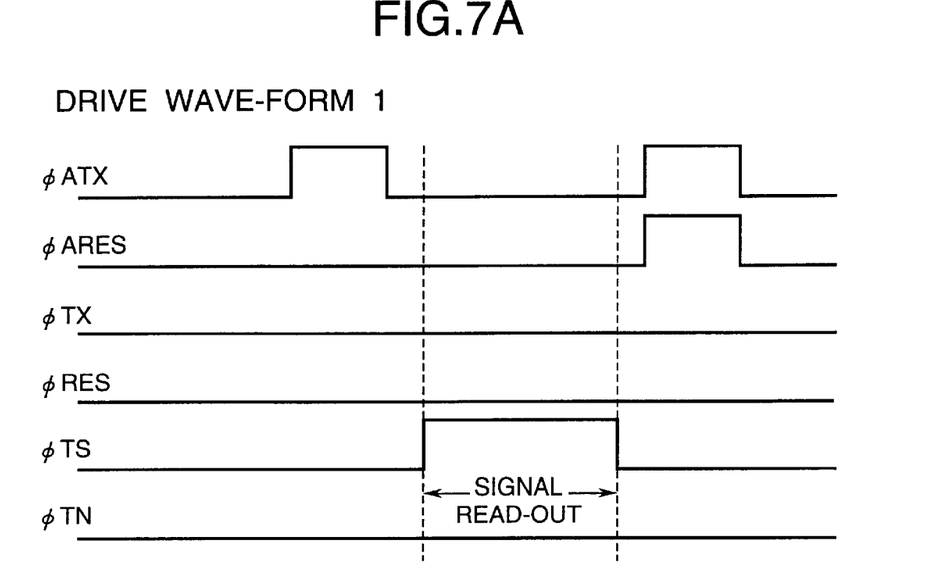
FIGS. 7A and 7B are timing charts of the third embodiment of the present invention.

The operation of the photoelectric conversion device of this embodiment will be explained below with reference to the timing charts shown in FIGS. 7A and 7B. In drive wave-form 1 shown in FIG. 7A, a simultaneous transfer pulse φATX goes High at the accumulation end timing of each photoelectric conversion element. Photocharge signal voltages of all pixels are then accumulated in the signal accumulation units via the signal output lines 906 by turning on the transfer switches 909b, and are time-serially read out until the simultaneous transfer pulse φATX changes to High level again. Upon completion of accumulation, both the simultaneous transfer pulse φATX and simultaneous reset pulse φARES are changed to High level to reset the photodiodes of each photoelectric conversion element and the input gate electrode of each read-out circuit. After the reset, each photodiode begins to accumulate photocharges.

Figure 7B:
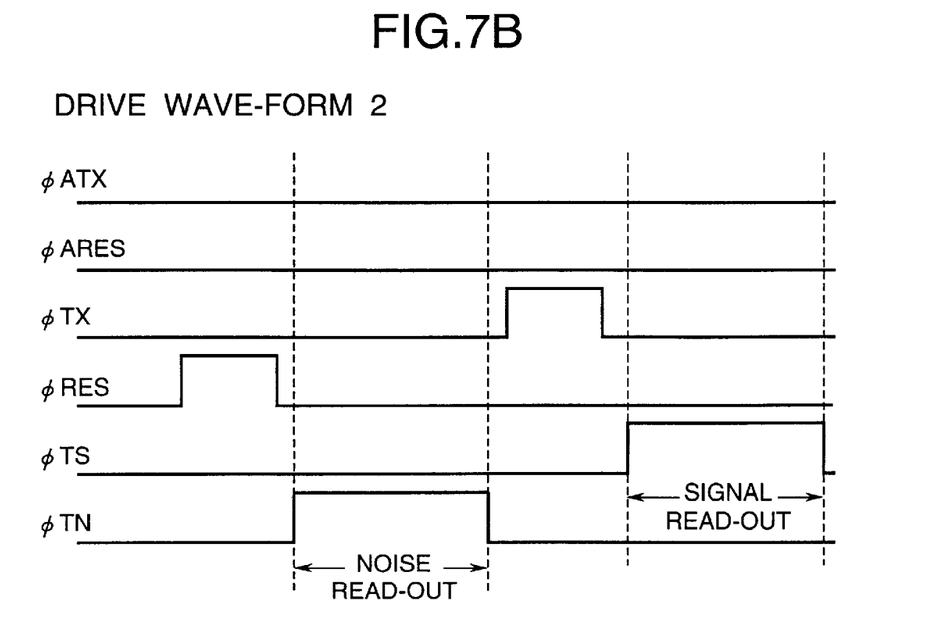

In drive wave-form 2 shown in FIG. 7B, a shift pulse φSR1 is changed to High level and a reset pulse φRES is changed to High level, thus resetting the input gate electrode of each read-out circuit. After that, the shift pulse φSR1 is kept at High level, and the residual charges at the input gate electrode of each read-out circuit are time-serially read out and output as a noise component level. When the accumulation end time of each photodiode has been reached, a transfer pulse φTX is changed to High level, thus accumulating photocharges in each photodiode in a memory unit such as a parasitic capacitance or the like of the input gate electrode of each read-out circuit. The photocharge signal voltage is read out and output by the read-out circuit. At this time, an image signal with high S/N ratio can be extracted by subtracting the previously stored noise component level from the output signal voltage.

In this embodiment, the timing examples in the high-speed image pickup mode and precise image pickup mode have been described. These image pickup modes may be automatically selected or may be manually selected by a selection switch.

As described above, when an electronic flash light-control signal, AF signal, or the like is read out from each photoelectric conversion element, the S/N ratio need not be improved but such signal must be read out at high speed by adjusting the accumulation start and end times in the respective photoelectric conversion pixels. On the other hand, in main image pickup, an image signal with high S/N ratio need be obtained even at low speed. In this manner, the first to third embodiments are suitable for selecting desired image pickup modes in corresponding to intended purposes.

The fourth embodiment will be described below.

An embodiment to which the photoelectric a conversion device of the present invention is applied to a video camera will be explained below with reference to FIG. 8.

Figure 8:
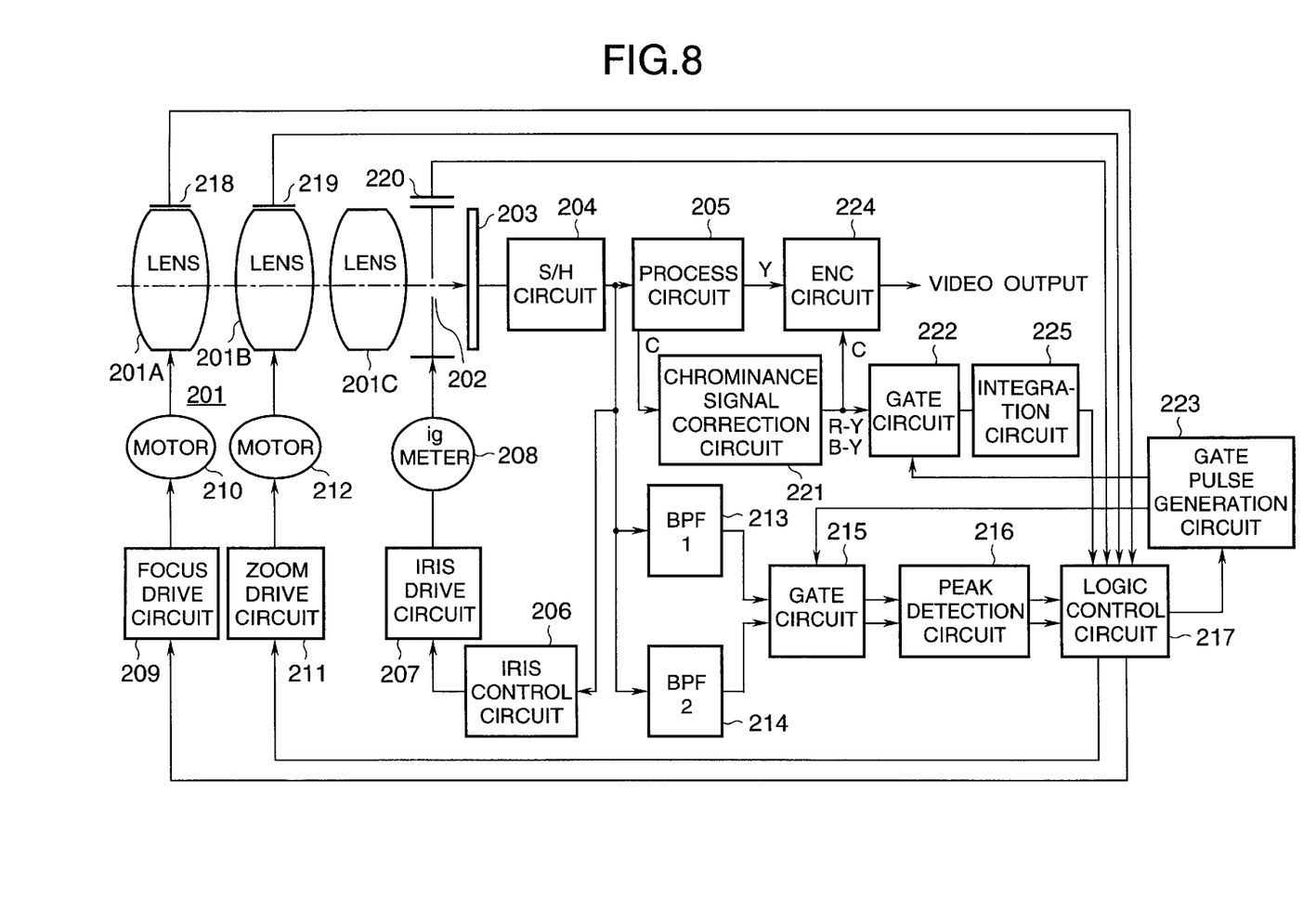
FIG. 8 is a block diagram of a video camera using a photoelectric conversion device of the present invention.

FIG. 8 is a block diagram showing a video camera to which the photoelectric conversion device of the present invention is applied. An image pickup lens 201 comprises a focus lens 201A for focus adjustment, zoom lens 201B for zoom, and lens 201C for imaging.

An iris 202 is placed behind the lens 201. A photoelectric conversion device 203 photoelectrically converts an object image formed on the image pickup surface into an electric image pickup signal. A sample & hold circuit (S/H circuit) 204 samples and holds the image pickup signal output from the photoelectric conversion device 203, and amplifies the level of the held signal. The circuit 204 outputs a video signal.

A process circuit 205 executes predetermined processes such as gamma correction, color separation, blanking process, and the like for the video signal output from the S/H circuit 204, and outputs a luminance signal Y and chrominance signal C.

The chrominance signal C output from the process circuit 205 is subjected to white balance & color balance correction in a chrominance signal correction circuit 221, and is then output as color difference signals R-Y and B-Y.

The luminance signal Y output from the process circuit 205 and the color difference signals R-Y and B-Y output from the chrominance signal correction circuit 221 are modulated by an encoder circuit (ENC circuit) 224, and are output as a standard television signal. The standard television signal is supplied to a video recorder or a monitor EVF of, e.g., an electronic viewfinder (not shown).

An iris control circuit 206 controls an iris drive circuit 207 on the basis of the video signal supplied from the S/H circuit 204, and the iris drive circuit 207 automatically controls an ig meter 208 to control the aperture value of the iris 202 so as to obtain a predetermined video signal level.

Bandpass filters (BPFs) 213 and 214 have different pass bands used to extract high-frequency components required for focus detection from the video signal output from the S/H circuit 204. Signals output from the first bandpass filter 213 (BPF1) and the second bandpass filter 214 (BPF2) are gated by a gate circuit 215 and focus gate frame signal, and their peak values are held and detected by a peak detection circuit 216. The detected signals of the circuit 216 are input to a logic control circuit 217. These signals are called focal point voltages, and the focus is adjusted based on the focus point voltages.

A focus encoder 218 detects the moving position of the focus lens 201A. A zoom encoder detects the focal length of the zoom lens 201B. An iris encoder 220 detects the aperture value of the iris 202. The detection values of these encoders are supplied to the logic control circuit 217 that controls the system.

The logic control circuit 217 performs focus detection and adjustment with respect to an object using a video signal corresponding to a selected in-focus detection area. More specifically, the circuit 217 receives the peak value data of the high-frequency components supplied from the bandpass filters 213 and 124, and supplies control signals of the rotation direction, rotation speed, rotation/stop, and the like of a focus motor 210 to a focus drive circuit 209 to drive the focus lens 201A to a position where the peak value of the high-frequency component is maximized, thus controlling the focus drive circuit 209.

In the aforementioned embodiment, a signal obtained in the precise image pickup mode described in the first to third embodiments is used as a signal for forming the standard television signal, and a signal obtained in the high-speed image pickup mode is used in iris control, focus adjustment, and the like.

The fifth embodiment will be described below.

An embodiment to which the photoelectric conversion device of the present invention is applied to a still camera will be explained in detail below with reference to FIG. 9.

Figure 9:
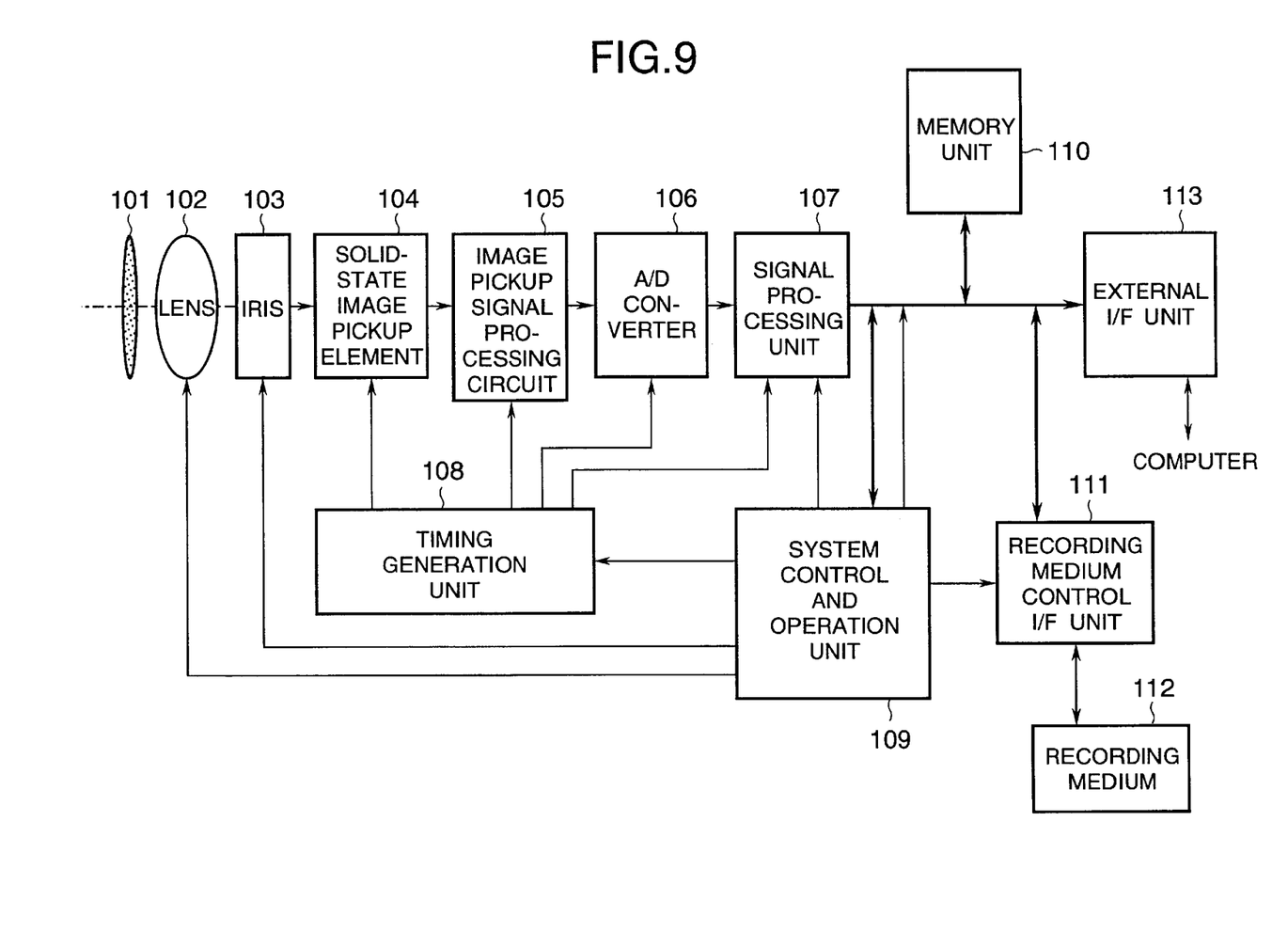
FIG. 9 is a block diagram of a still camera using a photoelectric conversion device of the present invention.

FIG. 9 is a block diagram showing a "still video camera" to which the photoelectric conversion device of the present invention is applied.

Referring to FIG. 9, the camera comprises a barrier 101 which serves as both a lens protection member and a main switch, a lens 102 for forming an optical image of an object on a photoelectric conversion device 104, an iris 103 for varying the amount of light that has passed through the lens 102, the photoelectric conversion device 104 for picking up an object image formed by the lens 102 as an image signal, an A/D converter 106 for analog-to-digital converting the image signal output from the photoelectric conversion device 104, a signal processing unit 107 for performing various kinds of correction for image data output from the A/D converter 106, and compressing the image data, a timing generation unit 108 for outputting various timing signals to a solid-state image pickup element 104, an image pickup signal processing circuit 105, the A/D converter 106, and the signal processing unit 107, a system control and operation unit 109 for performing various operations and controlling the entire still video camera, a memory unit 110 for temporarily storing image data, an interface (I/F) unit 111 for recording/reading out data on/from a recording medium, a detachable recording medium 112 such as a semiconductor memory for recording/reading out image data, and an I/F unit 113 for communicating with, e.g., an external computer.

The operation of the still video camera with the above arrangement upon image pickup will be explained below.

When the barrier 101 is opened, a main power supply is turned on, and a power supply for a control system is then turned on. Also, a power supply for image pickup system circuits such as the A/D converter 106 and the like is turned on.

The system control and operation unit 109 fully opens the iris 103 to control the exposure amount. A signal output from the photoelectric conversion device 104 is converted by the A/D converter 106, and is then input to the signal processing unit 107. Based on that data, the system control and operation unit 109 calculates the exposure value.

The brightness of an object is determined based on a photometry result, and the system control and operation unit 109 controls the iris in accordance with that determination result.

High-frequency components are extracted from the signal output from the photoelectric conversion device 104, and the system control and operation unit 109 computes distance to the object. The lens is then driven to check if an in-focus is attained. If it is determined that an in-focus is not attained, the lens is driven again to measure distance.

After an in-focus is confirmed, main exposure is started. Upon completion of exposure, an image signal output from the photoelectric conversion device 104 is A/D-converted by the A/D converter 106, and is written in the memory unit by the system control and operation unit 109 via the signal processing unit 107. The data stored in the memory unit 110 is recorded on the detachable recording medium 112 such as a semiconductor memory via the recording medium control I/F unit under the control of the system control and operation unit 109. Also, the data may be directly input to a computer or the like via the external I/F unit 113 and may be processed.

In the aforementioned embodiment, a signal obtained in the precise image pickup mode described in the first to third embodiments is used as a signal which is finally recorded on, e.g., the semiconductor memory or is externally output via the I/F unit 113, and a signal obtained in the high-speed image pickup mode is used as a signal for exposure value control, focus adjustment, and the like.

Many widely different embodiment of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   a plurality of photoelectric conversion pixels;
   a control unit, arranged to switch between a first mode for reading out first and second signals from each of said photoelectric conversion pixels, and a second mode for reading out the first signal from each of said photoelectric conversion pixels,
   wherein the first signal includes a noise signal produced upon resetting each of said photoelectric conversion pixels, and an optical signal produced by accumulating a photocharge, and
   wherein the second signal includes a noise signal produced upon resetting each of said photoelectric conversion pixels;
   a focus adjustment unit, arranged to perform focus adjustment using a signal obtained in the second mode; and
   a chrominance signal correction unit, arranged to correct a chrominance signal using a signal obtained in the first mode under a focus condition adjusted by said focus adjustment unit.

2. An image pickup apparatus comprising:
   a plurality of photoelectric conversion pixels, each of which includes at least a photoelectric conversion element and a read-out circuit; and
   a switching circuit which switches signal read out of said plurality of photoelectric conversion pixels between a first mode and a second mode,
   wherein the first mode is a mode for effecting a read-out operation for reading out from the read-out circuit a photo component level signal generated through photoelectric conversion in the photoelectric conversion element and not effecting a readout operation for reading out from the read-out circuit a noise component level signal generated after the read-out circuit is reset, and
   wherein the second mode is a mode for effecting the read-out operation for reading out from the read-out circuit noise component level signal generated after the read-out circuit is reset and the read-out operation for reading out from the readout circuit the photo component level signal generated through photoelectric conversion in the photoelectric conversion element.

3. An apparatus according to claim 2, further comprising a control circuit which modulates light on the basis of a signal read out in the first mode.

4. An apparatus according to claim 2, further comprising a control circuit which set a focus condition on the basis of a signal read out in the first mode.

5. An apparatus according to claim 2, further comprising a control circuit which sets an auto exposure (AE) condition on the basis of a signal read out in the first mode.

6. An apparatus according to claim 2, further comprising a control circuit which generates a moving image on the basis of a signal read out in the first mode.

7. An apparatus according to claim 2, further comprising a control circuit which generates a still image on the basis of a signal read out in the second mode.

8. An apparatus according to claim 6, further comprising a second control circuit which generates a still image on the basis of a signal read out in the second mode.

9. An apparatus according to claim 2, further comprising a control circuit which effects control so as to set at least one of a focus condition and an auto exposure (AE) condition on the basis of a signal read out in the first mode, perform a color processing on the basis of a signal read out in the second mode to generate image data, and record the generated image data.

* * * * *

UNITED STATES PATENT AND TRADEMARK OFFICE
CERTIFICATE OF CORRECTION

PATENT NO. : 6,839,084 B1
DATED : January 4, 2005
INVENTOR(S) : Hiroki Hiyama et al.

It is certified that error appears in the above-identified patent and that said Letters Patent is hereby corrected as shown below:

Column 1,
Line 33, "MOS switch 103" should read -- MOS switch 102 --; and
Line 67, "fier 15" should read -- fier 115 --.

Column 2,
Line 46, "sensor" should read -- and sensor --.

Column 5,
Line 33, "goes" should read -- go --.

Column 6,
Line 20, "then" should read -- the --.

Column 7,
Line 13, "corresponding" should read -- correspondence --; and
Line 15, "a" should be deleted.

Column 9,
Line 26, "embodiment" should read -- embodiments --.

Column 10,
Lines 14 and 22, "readout" should read -- read-out --; and
Line 29, "set" should read -- sets --.

Signed and Sealed this

Ninth Day of August, 2005

JON W. DUDAS
*Director of the United States Patent and Trademark Office*